Dec. 9, 1941.  A. F. JELINEK ET AL  2,265,239
TOOL SLIDE CONSTRUCTION FOR SCREW MACHINES
Filed July 20, 1940  4 Sheets-Sheet 2

INVENTORS:
ALFRED F. JELINEK &
WALTER E. GROSS
BY
ATTORNEYS

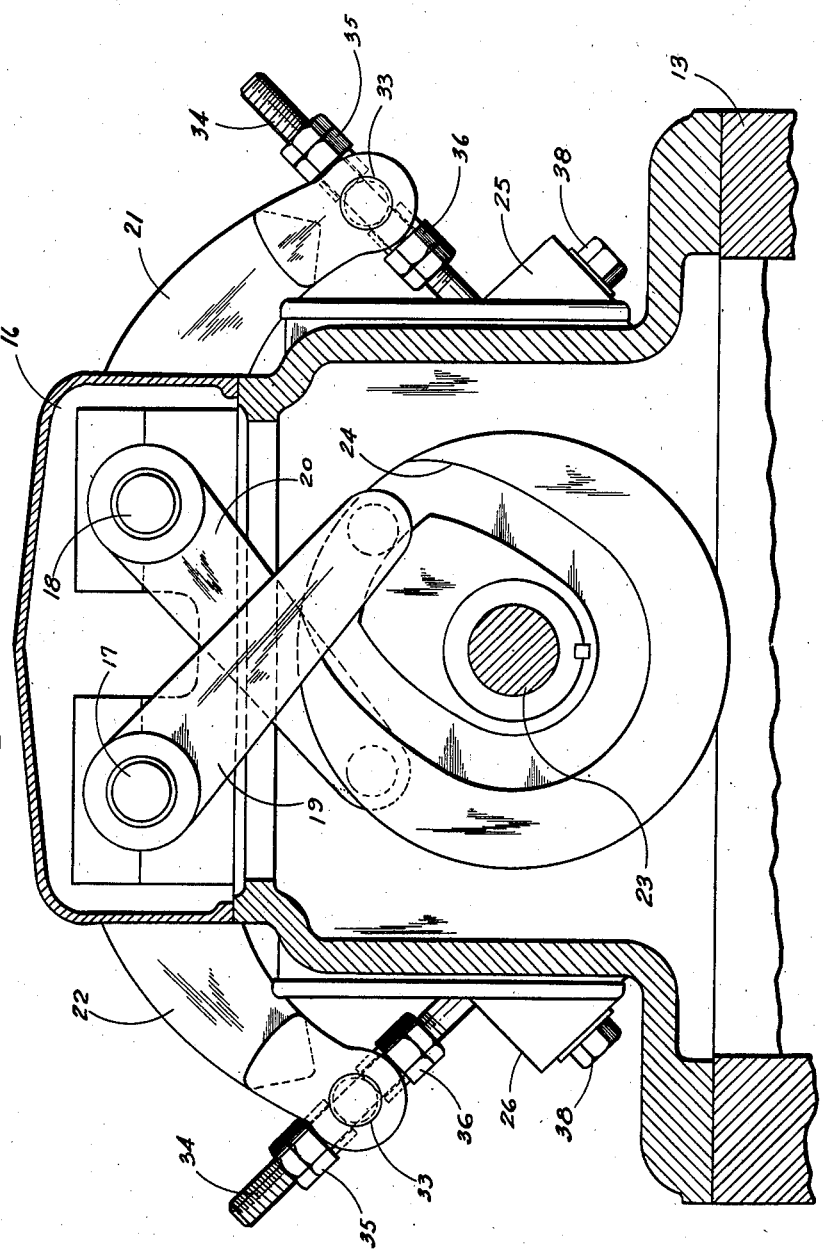

Dec. 9, 1941.      A. F. JELINEK ET AL      2,265,239
TOOL SLIDE CONSTRUCTION FOR SCREW MACHINES
Filed July 20, 1940        4 Sheets-Sheet 4
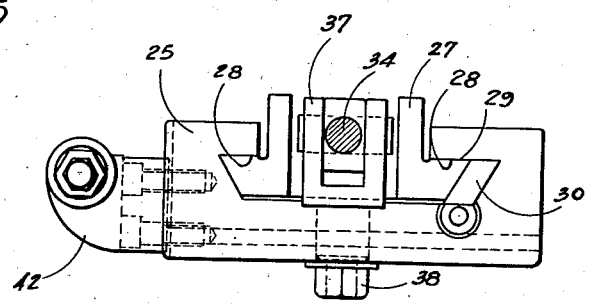
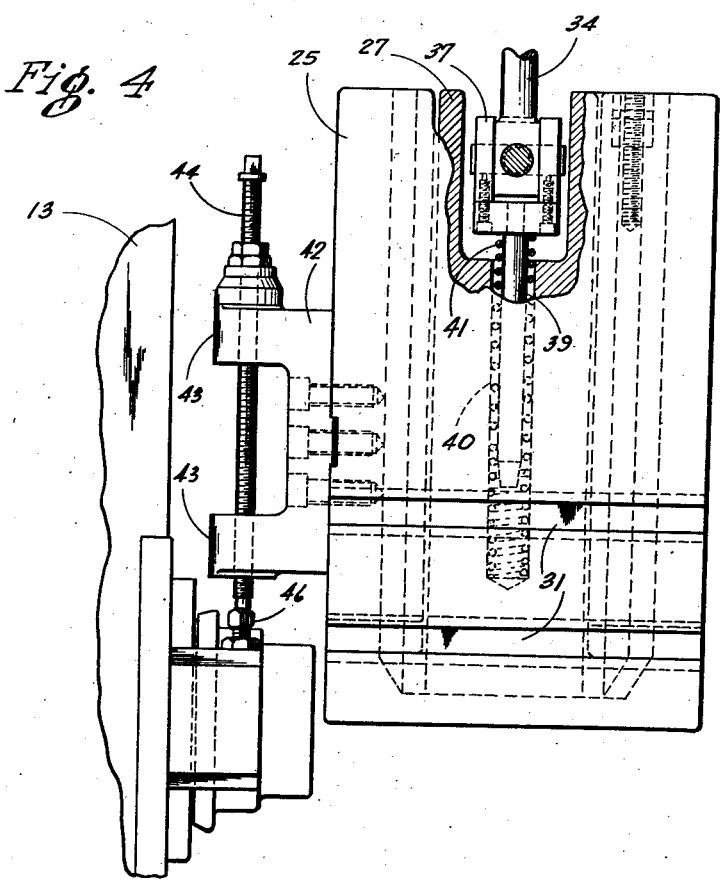
INVENTORS.
ALFRED F. JELINEK &
WALTER E. GROSS
BY
ATTORNEYS.

Patented Dec. 9, 1941

2,265,239

UNITED STATES PATENT OFFICE 2,265,239

TOOL SLIDE CONSTRUCTION FOR SCREW MACHINES

Alfred F. Jelinek and Walter E. Gross, Cleveland, Ohio, assignors to The Cleveland Automatic Machine Company, Cleveland, Ohio, a corporation of Ohio Application July 20, 1940, Serial No. 346,596

3 Claims. (Cl. 29—37)

This invention relates broadly to multi-spindle screw machines and more specifically to improvements in the actuating mechanism for auxiliary tool slides.

In multi-spindle screw machines where additional tool slides have been mounted upon a beam or bar connecting the upper portion of the two housings considerable difficulty has been encountered in the use of these tool slides when the machine is transformed from a four spindle to a five or six spindle machine. In the transformation of the machine modification of the tool slides is necessary in order to effect the prerequisite alignment thereof.

One of the objects of the present invention, therefore, is to construct a screw machine with a beam connecting the two housings and with a saddle secured thereto for mounting auxiliary tool slides thereon.

Another object of the invention is to provide a beam in the upper portion of the machine and a secondary driving mechanism mounted thereon to impart reciprocatory movement to such auxiliary tool slides as are subtended from said beam.

Another object of the invention is to provide a plurality of auxiliary tool slides on a machine which are adapted to be actuated through mechanism susceptible of adjustment to compensate for angular variations in the tool slides.

Other objects and advantages more or less ancillary to the foregoing and the manner in which all of the various objects are realized will appear in the following description, which considered in connection with the accompanying drawings, sets forth the preferred embodiment of the invention.

Referring to the drawings wherein the preferred embodiment of the invention is illustrated:

Fig. 3 is a transverse sectional view of the secondary driving mechanism showing the relation of the rocker arms with the driving mechanism and auxiliary tool slides, the section being taken on a plane indicated by the line 3—3 of Fig. 1;

Fig. 4 is an elevational view of an auxiliary tool slide, a fragmentary portion thereof being broken away and shown in section; and Fig. 5 is a plan view of the tool slide shown in Fig. 4.

Figure 1:
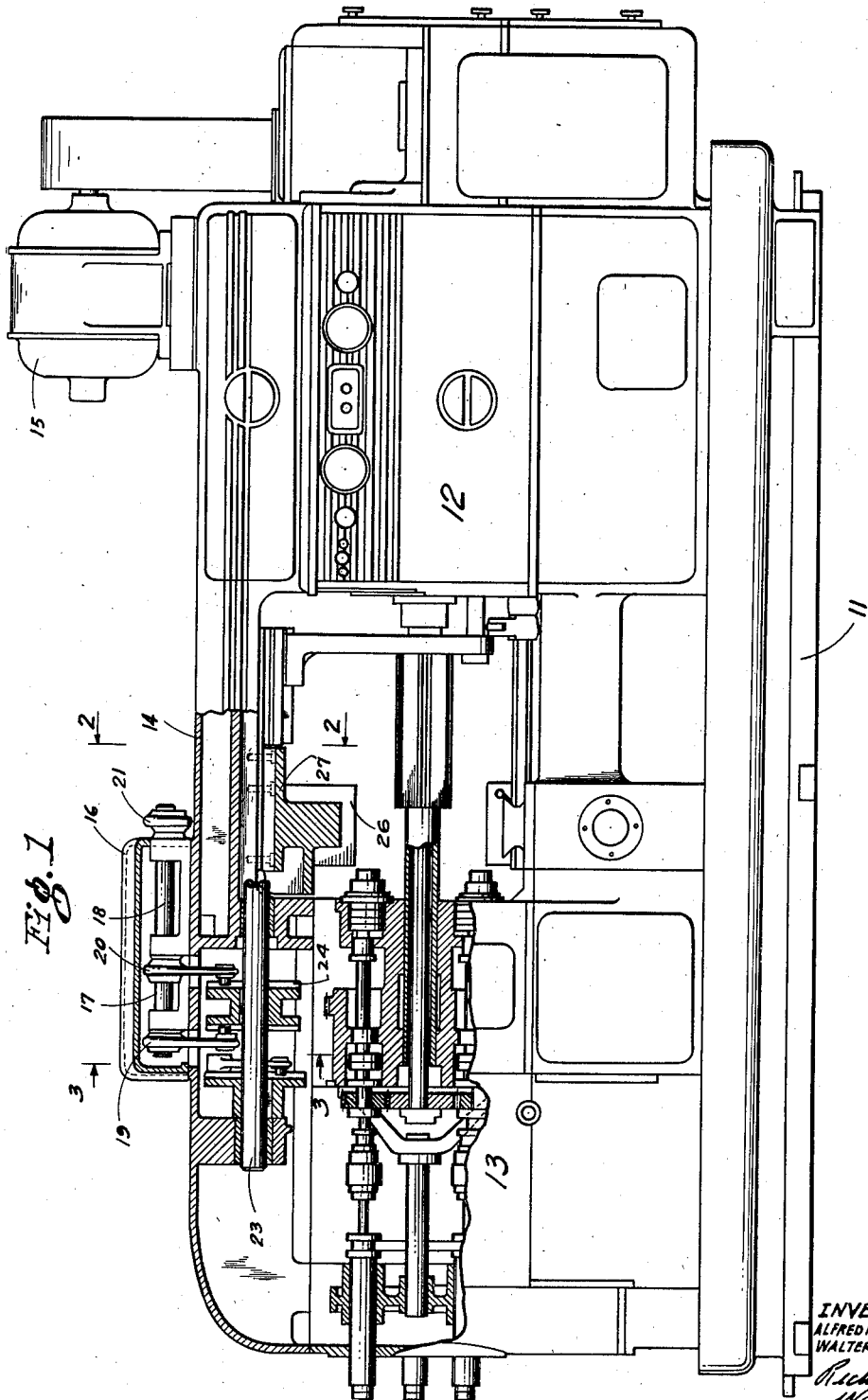
Fig. 1 is a front elevational view of an automatic multi-spindle screw machine having a portion of the spindle housing casing removed therefrom with the connecting beam, saddle and a portion of the driving mechanism for the auxiliary tool slides shown in section.

Referring to Fig. 1, the multi-spindle screw machine, chosen herein for the purpose of illustration, embodies, generally, a base 11 upon which there is supported a tool slide housing 12 and a multi-spindle housing 13 having a rotatable spindle cage therein. Intermediate the upper portions of the housings 12 and 13 there is a tubular beam 14 having the lower face thereof machined for the reception of an auxiliary tool slide supporting structure. Upon the top of the housing 12 there is a motor 15 having a sprocket secured to the outer end of its armature shaft which is coupled with gearing, not shown, for driving the spindles and actuating mechanism within the housings 12 and 13.

Mounted upon the top of the housing 13 there is a casing 16 having a pair of drive shafts 17 and 18 supported therein, which have affixed to an end thereof the depending arms 19 and 20. Secured to the opposite ends of the drive shafts there are rocker arms 21 and 22 coordinated with auxiliary tool slides, to effect the reciprocative movement thereof. Journaled in the upper portion of the housing 13 superjacent the spindle cage there is a cam shaft 23 having a track cam 24 mounted thereon, machined for engagement with rollers in the end portions of the arms 19 and 20 to effect the oscillation of the drive shafts 17 and 18.

Figure 2:
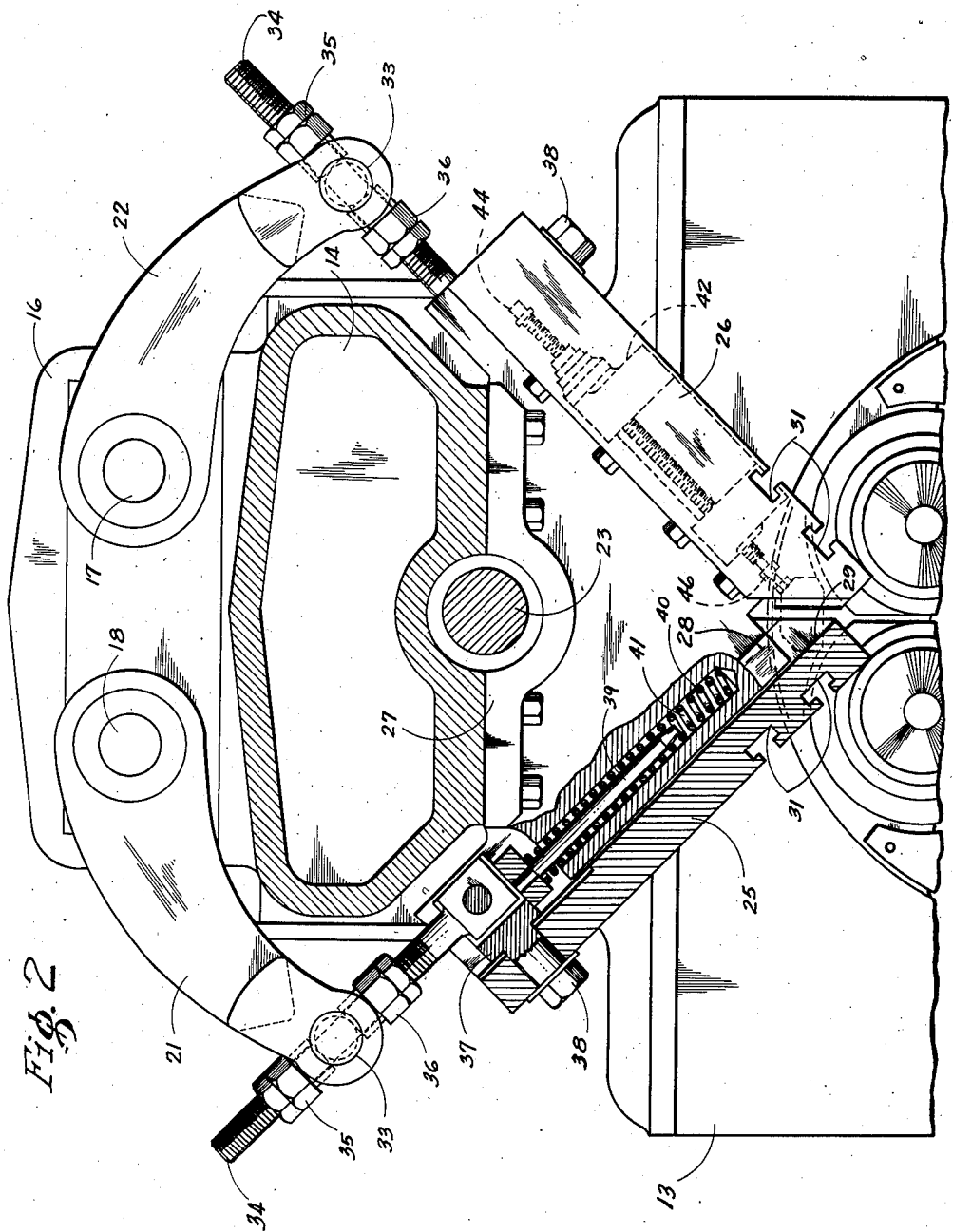
Fig. 2 is a transverse sectional view of a portion of the screw machine illustrating the relation of the saddle, tool slides and connecting beam, the section being taken on a plane indicated by the line 2—2 of Fig. 1.

The auxiliary tool slides 25 and 26 are mounted on a bracket or saddle 27 bolted upon the beam 14. Although the saddle is shown (Fig. 2) as formed to accommodate the slides to the uppermost spindles, it will be understood that other brackets of a similar character but machined with obtuse angles can be readily substituted therefor, when it is desired to arrange the slides in operative position with other spindles. The opposed faces of the saddle are machined with laterally projecting flanges 28 (Fig. 5) which are engaged in grooves 29 formed in the tool slides 25 and 26. The slides are preferably provided with adjustable gibs 30 interposed between contiguous faces of the saddle and the tool slides to prevent lateral movement of the slides as wear occurs. The upper faces of the tool slides are formed with T-slots 31 to accommodate the reception of the tool blocks or cutting tools as is customary in machines of this type.

The outer ends of the rocker arms 21 and 22 are bifurcated and drilled for the reception of pins 33 which are cross drilled to receive bolts 34 having nuts 35 and 36 threaded thereon to facilitate adjustment of the slides. The enlarged end of the bolt 34 is pivotally supported in the yoked end of a pin 37 which is affixed to the tool slide by a nut 38. A plunger 39 secured to the lower face of the yoked end of the pin 37 is adapted to reciprocate within a bore 40 formed in the saddle 27. Seated within the bore 40 and encircling the stem of the plunger 39 there is a coil spring 41 which engages the head of said plunger for cushioning the tool slide in its downward movement. As shown in Fig. 4, the tool slide 25 has affixed to the side thereof, adjacent the face of the spindle cage, a plate 42 provided with lugs 43 which are drilled and tapped for the reception of a screw 44. The screw 44 is disposed for abutting engagement with a stop 46 secured to the spindle cage and provided to limit the downward movement of the tool slide.

During the operation of the machine rotation of the cam drum 24 may be so timed as to move the auxiliary tool slides 25 and 26 for operative engagement with the work pieces supported in the spindles prior to, contemporaneous with or subsequent other tooling operations on the work. The rotation of the cam shaft 23 imparts an oscillatory movement to the drive shafts 17 and 18 through the cam 24 and depending arms 19 and 20. The oscillation of the drive shafts is translated into reciprocatory movement for the tool slides by the rocker arms 21 and 22 which are interposed between said drive shafts and the slides. The angular relation of the tool slides with the beam relieves the actuating mechanism from the deleterious effects of the load to which they are subjected since a portion of the thrust is transmitted through the slides to the saddle and the beam.

Often it is necessary to change from one type of spindle cage to another and still retain the use of the auxiliary tool slides. Whenever this occurs the tool slides may be removed from the saddle by loosening the gibs 30, unscrewing the nuts 35 on the bolts 34, thus releasing the rocker arms, after which the tool slides may be removed from the saddle. Removal of the saddle and the substitution therefor of another having side faces of different angles will accommodate the operative engagement of the tools with the spindles in a spindle cage of different form. The bolts 34 are of adequate length to facilitate the adjustment of the rocker arms to prevent said arms from striking the beam when the angular position of the tool slides is changed.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

We claim:

1. A screw machine embodying a tool slide housing and a spindle housing having an indexible spindle cage therein, a beam connecting said housings, a saddle secured thereto, tool slides mounted on said saddle, rocker arms connected thereto, a block mounted on the spindle cage, a casing mounted on the top of said spindle housing, drive shafts supported therein and affixed to said rocker arms, a rotating cam mounted in the upper portion of said spindle housing superjacent said cage, arms on said drive shafts engaging said cam for oscillating the rocker arms and adjustable means on said tool slides adapted for abutting engagement with said block to limit the downward movement of said tool slides upon the movement of said rocker arms.

2. In a screw machine embodying a tool slide housing, a spindle housing having a rotatable spindle cage therein and a beam connecting said housings, mechanism for performing an operation on a work piece in said spindle cage comprising, tool slides subtended from said beam, rocker arms secured to said tool slides, a casing mounted on the top of the spindle housing, drive shafts supported therein and affixed to said rocker arms, arms mounted on said drive shafts and extending into said housing, and means within the upper portion of said machine and in the vertical plane of the axis of said cage coacting with said last named arms to move said tool slides into engagement with the work piece.

3. A screw machine embodying a spindle housing having a plurality of spindles therein disposed in equi-distant relation about a common axis, a cam shaft in said housing superjacent said spindles and in the vertical plane of the common axis of the spindles, a cam on said cam shaft, a casing on the top of said housing, a drive shaft journaled therein, an arm mounted on said shaft and operatively engaged with said cam, a tool slide on said housing contiguous one of the spindles, a second arm mounted on said drive shaft, a bolt intermediate said tool slide and said second named arm and means on said bolt for adjusting the position of the tool slide in relation to the contiguous spindle.

ALFRED F. JELINEK.
WALTER E. GROSS.